Fig. 5

Feb. 9, 1932.   K. W. HALLDEN   1,844,573
APPARATUS FOR MEASURING AND SEVERING MOVING ARTICLES
Filed April 21, 1928   5 Sheets-Sheet 4

INVENTOR
Karl William Hallden
BY
Richey & Watts
ATTORNEYS

Patented Feb. 9, 1932

1,844,573

UNITED STATES PATENT OFFICE

KARL WILLIAM HALLDEN, OF THOMASTON, CONNECTICUT, ASSIGNOR, BY MESNE ASSIGNMENTS, TO STEEL AND TUBES, INC., A CORPORATION OF OHIO

APPARATUS FOR MEASURING AND SEVERING MOVING ARTICLES

Application filed April 21, 1928. Serial No. 271,716.

This invention relates to apparatus for severing or otherwise acting upon a moving article and more especially to new and improved means for severing such an article into pieces of substantially uniform length.

It also relates to new and improved apparatus for controlling actuation of the cut-off mechanism; for timing actuation of the cut-off mechanism with respect to the speed of travel of the moving article to obtain pieces of substantially equal predetermined length; and for adapting the cut-off mechanism to a wide range of speeds of travel of the moving article and to a wide range of lengths of severed pieces.

This invention also relates broadly to apparatus for periodically acting upon a continuously moving article in any desired manner and to apparatus for providing indications on a moving article which may be for varied purposes such as for designating measured lengths of the article or for stamping marks thereon at periodic intervals.

It also relates to new or improved means for decreasing the jar and force incident to starting and stopping the cut-off mechanism; for progressively increasing and decreasing the speed of travel of the cut-off mechanism; and for combining in one device the jar or force reducing means and the speed varying means in a manner to obtain the separate advantages of each and the combined advantages of both.

It further relates to new and improved mechanism for gripping a moving article to be severed and for actuating the gripping means.

My herein described invention lends itself to embodiment in compact, durable, substantial apparatus in which the parts are actuated positively throughout a part of their movement and, throughout all their movements with one or two minor exceptions, which is a feature of commercial importance where a high degree of accuracy is required in the lengths cut from a rapidly moving article.

My present invention is adaptable to the severing of a moving article with improved cut end characteristics which renders the severed pieces susceptible to various uses.

The inventions claimed herein are improvements over the subject matter claimed in my co-pending application, Serial No. 271,715, filed April 21, 1928 which has become Patent No. 1,836,712.

For the purpose of disclosing my invention so that others may be enabled to practice the same, I have elected to describe an apparatus embodying my invention and adapted to sever moving metallic tubing. I do not desire, however, to limit my invention to this particular apparatus or article since my invention may be embodied in widely different apparatus and used in severing articles of a variety of shapes and compositions without departing from the spirit of my invention, the scope of which is defined in what is claimed.

In the drawings accompanying and forming a part of this specification.

In the drawings, 1 designates a fixed base, which may be a hollow casting, and carries on its top surface a centrally disposed preferably detachable table 2, two upright brackets 3 in which a shaft 21 is rotatably journaled. The table supports the legs 5 of a carriage 6. A guide plate 7 secures the legs in sliding engagement with the table. Preferably the carriage is positioned to slide in a horizontal plane on the table.

The carriage has two uprights 8 each recessed longitudinally to slidingly receive arms 9 and guides 10 which arms and guides are secured to a bar 11 slidably engaging in openings in the uprights and carrying an article cutting blade 12 removably secured thereto between the uprights 8. This blade or cutter extends downwardly into a pair of oppositely disposing die carrying blocks 13 reciprocable between the uprights 8. These blocks are suitably recessed as at 14 to permit the blade 12 to move downwardly between the blocks, and each block is provided with two article engaging dies 15 separated at their adjacent ends by an amount slightly in excess of the thickness of the blade.

Each die block 13 slidingly engages with the carriage between the two uprights 8 and carries an eccentric pin 16 extending longitudinally therethrough and fitted at either end with the branches 17 of a yoke 18 which surrounds the outer three sides of the adjacent upright. The branches 17 of each yoke have elongated slots through which studs 19 pass into the uprights 8 to permit sliding movement of the yokes with respect to the studs and uprights. Filler blocks 20a extend through openings 20 in each of the uprights and engage at one end with the yokes and at their inner ends with the arms 9 in certain positions of the latter to move the yokes and die blocks outwardly.

The arms 9 contact with the eccentric pins 16 in certain positions to move the yokes and die blocks inwardly.

The shaft 21 passes through elongated slots 22 in the legs 5 of the carriage 6 and has keyed thereto, outside of the said legs, two heart-shaped cams 23 which engage at diametrically opposite horizontal points with cam rollers 24 carried on suitable axles 25 attached to the legs of the carriage.

The shaft 21 has keyed thereto two eccentrics 26 disposed adjacent to and on the outside of the cams 23 and each eccentric carries an eccentric strap 27 elongated in the form of a connecting rod 28 and pivotally attached to extensions 29 of the guides 10. These eccentrics are so positioned on the shaft with respect to the heart-shaped cams that when the carriage is in its initial position at the forward end of its stroke, the high point of the eccentric is forwardly of and in the same horizontal plane with the center of the shaft and the blade is disposed slightly above the top of the dies which are to be clamped about the moving article. By reason of this relative positioning of the several parts, the blade is moved downwardly through the article to be severed during the first quarter revolution of the shaft, is retracted therefrom to a point just above the article in the next quarter revolution of the shaft and is then moved to the extreme upper position and brought down to its initial starting point during the next half revolution of the shaft. Since the carriage is initially positioned at the forward end of its stroke and the blade is initially positioned at a point intermediate the ends of its stroke and on the downward portion thereof, it is possible to sever a moving article during a half revolution of the shaft and during the rearward movement of the carriage, which fact is of considerable commercial importance because it makes possible the cutting of rapidly moving articles by a slowly reciprocating blade and a slowly driven shaft, thereby avoiding the practical difficulties incident to high speed revolution of a single revolution shaft.

The shaft 21 has an enlarged brake drum 30 keyed to one end thereof and a brake band 31 surrounding the same and secured to the base and provided with an adjustable spring 32 for regulating the amount of friction exerted on the brake drum by the band. The brake drum is provided with a disc or disc portion 33 having a diametrically extending wedge shaped groove 34 in which is secured a threaded rod 35 carrying a crank pin 36 adjustable thereon which pin in turn pivotally carries a threaded sleeve 37 having adjustable screw threaded engagement with a rack bar 38, the remote end of which is carried by a housing 39 supported on an extended end of a clutch housing 40 which is rotatably carried in a suitable bracket 41 on the forward end of the base. The threaded rod 35 serves as a means for adjusting the position of the crank pin 36 relative to the axis of the brake drum and shaft 21 thereby controlling the throw of the pin 36 while the threaded connection 42 between the sleeve 37 and the rack bar 38 permits adjustments to be made in the total length of the rack arm. The brake band 31 applies constant frictional drag to the brake drum 30 and serves to stop the rotation of the shaft 21 when the clutch is released.

The clutch housing 40 contains a pinion 43 secured thereto in mesh with the teeth on the rack bar. The housing 40 is recessed at its inner end to cooperate with a clutch disc 44 of the roll locking type which is keyed to a trip shaft 45 rotatably mounted in housing 40.

The trip shaft 45 has secured thereto a brake drum 47 fitted with a brake band 48 secured to the base 1 and fitted with a spring 49 for exerting any desired amount of spring pressed friction on the brake drum to oppose rotation thereof.

A bracket 50 corresponding to bracket 41 is disposed near the opposite side of the base 1 and carries a rotatable clutch housing 51 similar to housing 40 and in turn rotatably receives the trip shaft 45. This housing 51 forms part of a clutch similar to the one described above, except that the disc 52 thereof is positioned with its roller notches pointed in the opposite direction to permit rotation of the housings 40 and 51 in opposite directions. A hand operated clutch 53 slidably mounted on the trip shaft 45 and manipulated by the hand lever 54 pivoted to the upstanding post 55 on the base serves to connect the trip shaft with the housing 51 when it is desired to employ the indicating or measuring device, including the rack 38 and shaft 45 but this clutch may be disengaged when it is desired that the moving article be not severed.

The shaft 21 is equipped at its end remote from the brake drum 30 with a clutch housing 56 rotatable relative thereto and having secured to its outside a bevel gear 57 which meshes with a bevel pinion 58 on one end of a substantially horizontal worm shaft 59 carried in upright brackets 60 secured to the side of the base 1. This shaft 59 is fitted at its other end with a gear 61 meshing with a gear 62 carried on a main drive shaft 63, which shaft is suitably geared to means such as rolls 64 for propelling the article to be cut at a substantialy constant speed.

The bevel gear carrying housing 56 is fitted in its interior with an annulus 65 preferably composed of a relatively hard material which will not be marked or injured by engagement with the rollers 69 of the clutch. The shaft 21 has secured thereto a disc 66 having a notched periphery and disposed concentrically within the annulus 65, and preferably provided with inserts 67 of material corresponding in hardness to that of the ring and located in the more shallow portions of the said notches. A basket 68 is fitted about the extended end of the shaft 21 and maintains rollers 69 engaging the inner periphery of the annulus 65 and disposed in the notches of the disc 66. A spring 70 coiled about the shaft is attached at one end to the basket, and at the other end to the shaft as by means of a cap 71 adjustably positioned at the end of the shaft 21, the function of such spring being to rotate the basket in the direction of rotation of the annulus to bring the rollers into pinching engagement between the annulus and the shallower parts of the notches and thereby to effect a driving connection between the annulus and the shaft.

The basket 68 is provided on its outer surface with a projection 72 engageable with a spring pressed pawl 73 carried by a pivoted lever 74, which lever is adjustably secured to a second pivoted lever 75. This second lever 75 has a projection 76 engageable with the cam 77 secured to trip shaft 45 and is pivoted by the cam when the trip shaft 45 is rotated by worm gear 82 which meshes with worm shaft 59 so as to retract the pawl 73 from engagement with the projection on the basket. When the pawl is so retracted, the spring 70 immediately rotates the basket 68 and brings the roller into driving connection between the annulus 65 and the disc 66. When the cam 77 rotates beyond the projection 76 on lever 75, a spring 79 attached thereto and to the worm shaft bracket 60 restores the levers 74 and 75 and pawl 73 to their initial positions and the pawl then engages with the projection on the basket at the completion of a single revolution of the shaft and prevents further rotation of the basket with the annulus.

The worm shaft 59 is preferably fitted with thrust bearings in its brackets 60 to prevent endwise movement with resulting inaccuracy in the measuring device and variation in the lengths of the pieces severed from the moving article. This worm shaft has a worm gear 81 engaging with a worm wheel 82 keyed to the clutch housing 51 by means of which the trip shaft 45 is continuously rotated in one direction at a uniform speed having a predetermined relation to the speed of travel of the article to be severed, except at such times as the shaft is advanced at a more rapid speed by the rack and associated parts. This apparatus operates as follows:

The worm shaft 59 is driven by main drive shaft 63 at a speed bearing a predetermined ratio to the driving speed of the rolls 64. The shaft 59 drives the trip shaft 45 through the worm 81 and clutch 51 and also drives the bevel gear 57. As the trip shaft rotates, the projection 76 on cam 77 engages lever 75 and pivots the levers 74 and 75, thereby retracting pawl 73 from projection 72 on basket 68. The spring 70 thereupon revolves the basket 68 in the direction of rotation of bevel gear 57 and brings the rollers 69 into pinching engagement between the annulus 65 and disc 66 wherupon the bevel gear 57 rotates the shaft 21. As this shaft rotates, the heart cams 23 move the carriage 6 rearwardly of the base 1 and then back to its initial starting point during which time the eccentrics 26 move the cutter blade 12 downwardly across the path of travel of the moving article and then up to the upper end of the blade stroke and back to its starting point. The arms 9 move the die blocks 13 toward each other and bring the dies 15 into gripping engagement about the moving article to be severed before the cutter blade 12 engages with the article and maintains such gripping engagement until after the blade has been moved back across and to a point above the article, after which the arms 9 separate the blocks 13 by pressing the filler blocks 20 outwardly so that the dies are disengaged from the article.

When the shaft 21 rotates, it reciprocates the rack bar 38, provided the crank pin 36 is located off the axis of the shaft 21. When the rack bar moves forwardly, the clutch housing 40 is rotated by the pinion 43 keyed thereto but such rotational movement is not transmitted to the trip shaft 45 because the clutch disc 44 permits rotational movement of the housing 40 rearwardly with respect thereto. When the rack bar 38 is reciprocated rearwardly, the housing 40 rotates forwardly and forms a driving engagement with the disc 43 and rotates the trip shaft 45. The gearing between the rack and its pinion is such that the trip shaft 45 is rotated forwardly at a greater speed than its normal speed due to the worm wheel 82, such acceleration being permitted by the clutch housing 51 and disc 52.

It will be understood that the measuring device is preferably constructed for the longest length of pieces to be severed from the moving article the crank pin 36 then being disposed on the axis of shaft 21. Shorter lengths may be cut by adjustment of the crank pin in the brake drum. When, for example, it is desired to sever the moving article into pieces half the length of the originally set length, the crank pin 36 is so adjusted in groove 34 that after the cam 77 trips the main shaft 21 by retracting the pawl from the projection on the basket, the main shaft, acting through the rack and trip shaft, will rotate the cam 77 forward through substantially half of its rotational movement, thus causing twice as many engagements of the cam with the clutch tripping lever 75 as would normally take place with the original setting of the pin 36 and thereby forming articles of half the length of those which would be cut from this moving article with the setting of the pin on the axis of shaft 21.

Inasmuch as the shaft is rotatable at a relatively high speed with respect to the trip shaft and cam, pieces of practically the smaller commercial sizes may be cut from an article moving at the higher speeds now used commercially in welded steel tubing; and by making suitable adjustments, a wider range of lengths of cut pieces and a wider range of speeds of the article to be severed may be accommodated.

Figure 1:
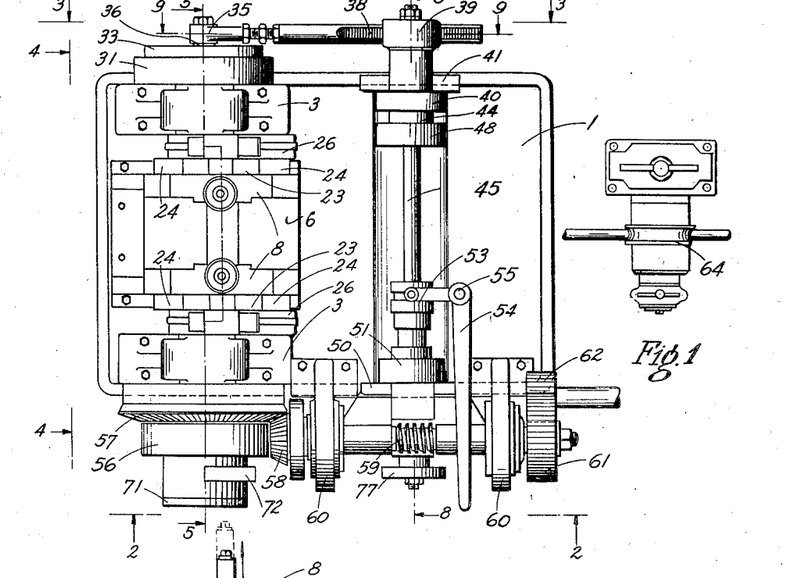
Fig. 1 is a plan view of one form of device embodying my invention.
Figure 2:
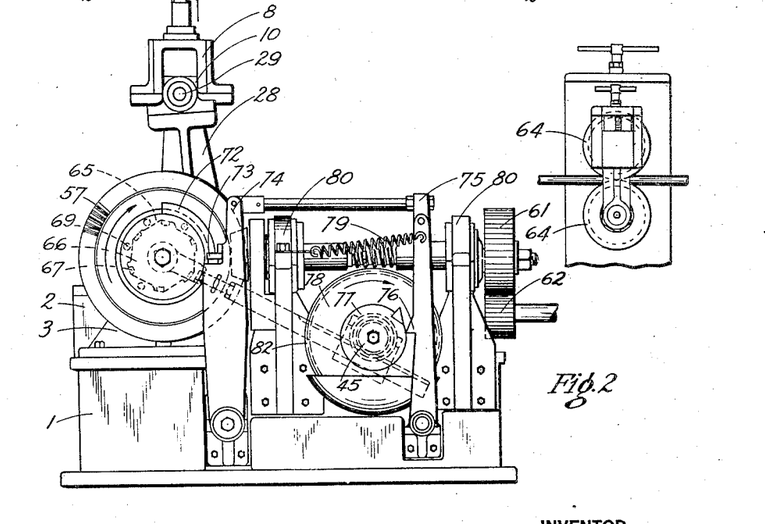
Fig. 2 is a view in side elevation taken on line 2—2 of Fig. 1.
Figure 3:
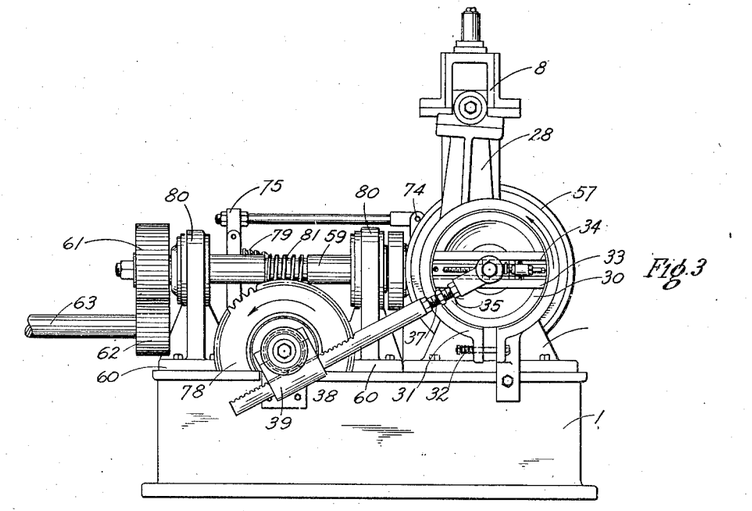
Fig. 3 is a view similar to Fig. 2 but taken on line 3—3 on Fig. 1.
Figure 4:
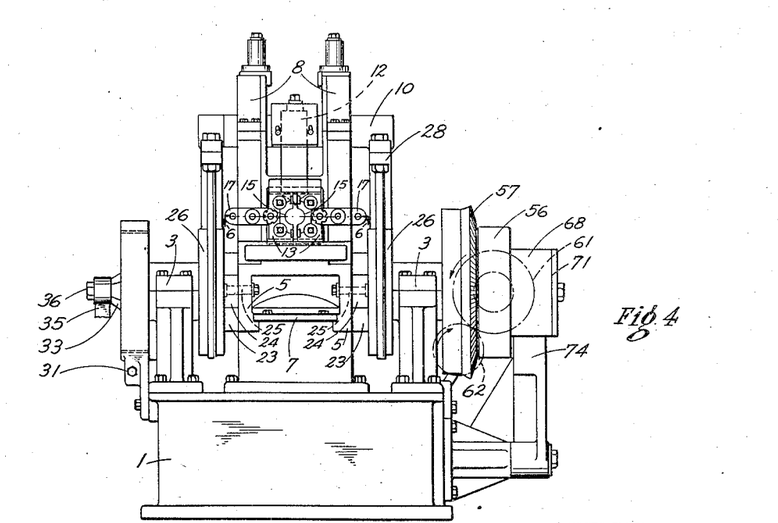
Fig. 4 is a rear end elevational view taken on line 4—4 of Fig. 1.
Figure 5:
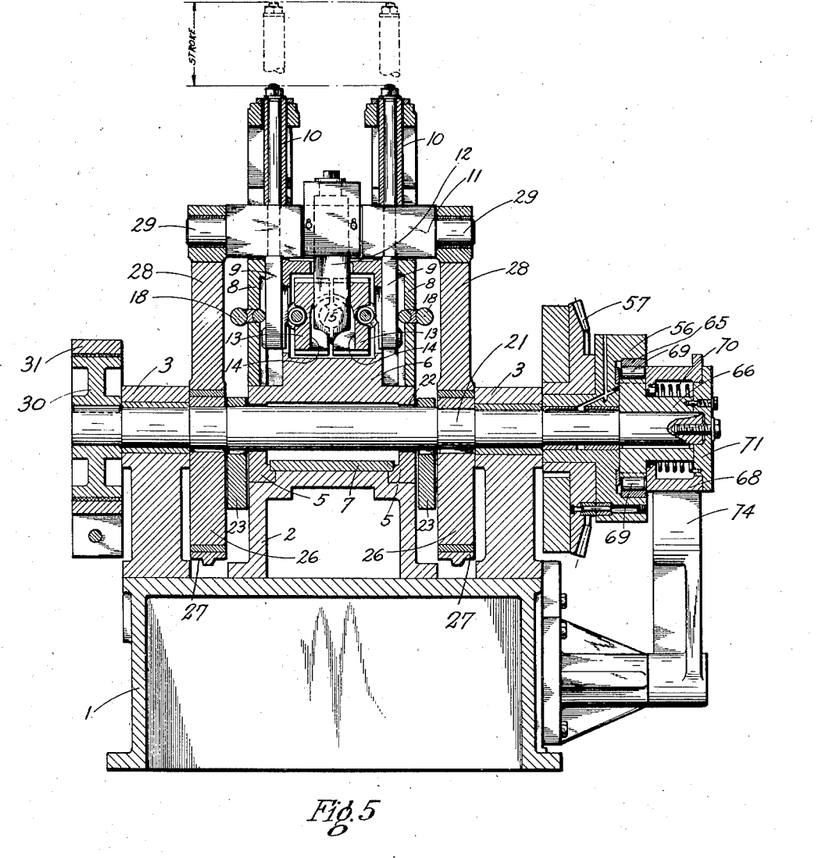
Fig. 5 is a transverse sectional view through the main shaft taken on line 5—5 of Fig. 1.
Figure 6:
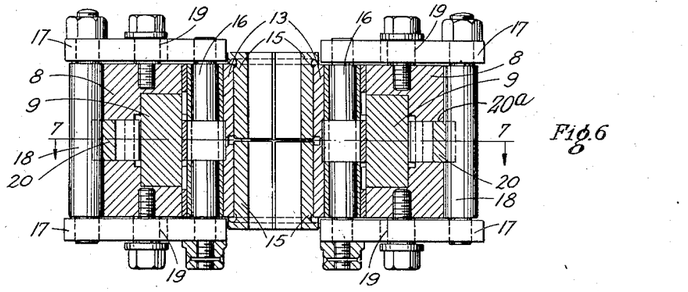
Figs. 6 and 7 are sectional views of the article gripping members and means for actuating the same, taken respectively on lines 6—6 and 7—7 of Figs. 4 and 6.
Figure 7:
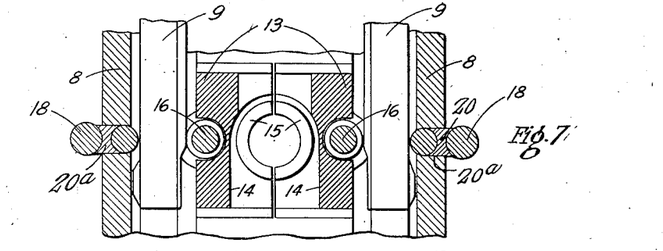
Figure 8:
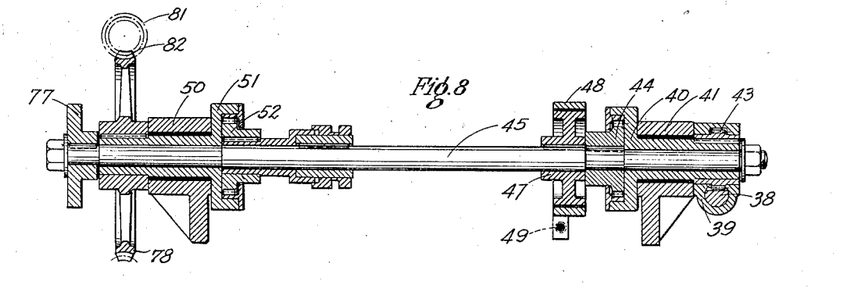
Figs. 8 and 9 are longitudinal sectional views of the measuring device rack and shaft and associated parts taken respectively on line 8—8 and 9—9 of Fig. 1.
Figure 9:
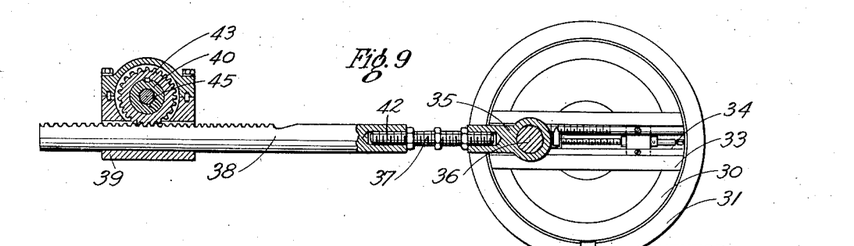
Figure 10:
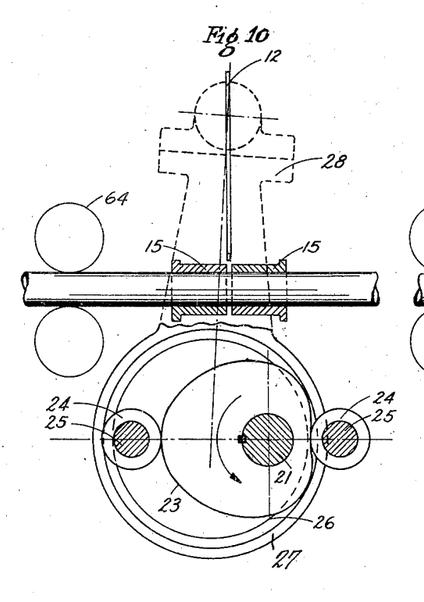
Figs. 10, 11, 12 and 13 are diagrammatic views showing relative positions of the cutter blades, cams and eccentrics at various points in their movements.
Figure 11:
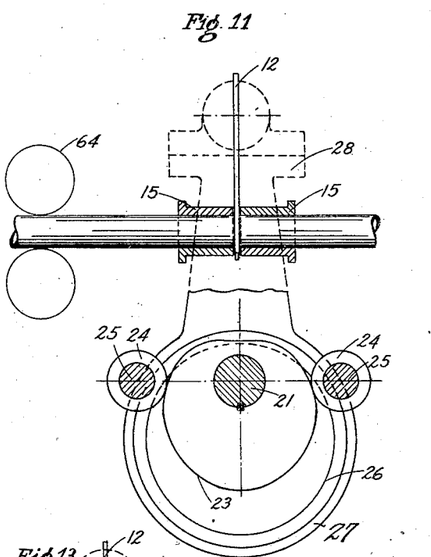
Figure 12:
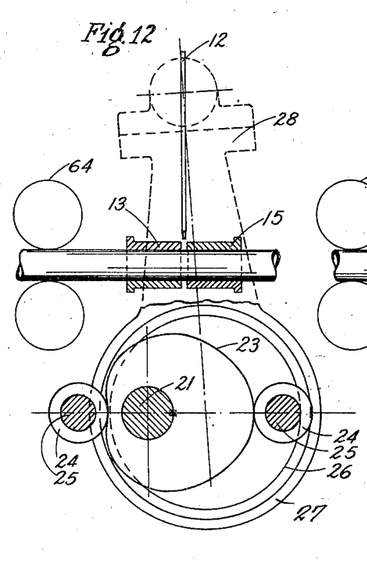
Figure 13:
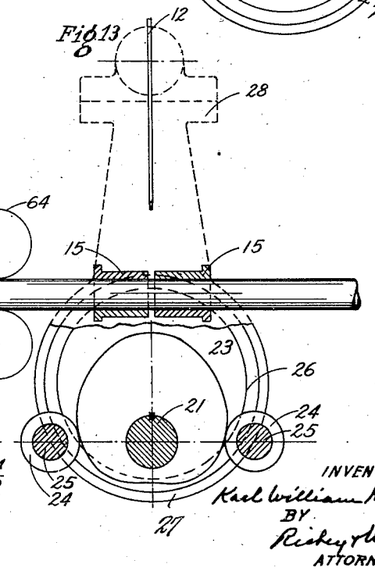

The cams 23 shown more clearly in Figures 10 to 13, inclusive, are of the heart-shaped variety but have blunt points and a virtually straight large end. The shape of these cams is such that approximately the first 15% of the rotation thereof is employed to increase the speed of the carriage gradually from zero to its maximum, while approximately the last 15% of the first half revolution of the cams permits a correspondingly gradual decrease from such maximum speed down to zero. Moreover the stopping of the carriage at each end of its stroke is accomplished with a decreased amount of jar to the carriage and base by reason of the flattened large end of the cam which does not permit the cam rollers 24 to drop into a depression on the cams 23 and engage a steeply inclined wall.

The particular position of the cams and the eccentrics as indicated in Figures 10 to 13, inclusive, permits the realization of the advantages due, not only to the cams and eccentrics acting separately but also acting in combination with each other. With the eccentrics serving to exert a horizontal component of the reciprocating force of the eccentric straps and connecting rods on the carriage which is opposed to the movement of the carriage near the ends of the carriage stroke and with the cams shaped and positioned to slow down movement of the carriage gradually near the ends of its stroke and bring it to a stop without jolts and jars, the herein described combination of these parts work together in such a manner that both of these operations tend to assist each other and to relieve the apparatus of stopping strains.

Having thus described my invention, what I desire to secure by Letters Patent is defined in what is claimed:

1. Apparatus for severing a moving article which comprises a single revolution shaft having a fixed longitudinal axis, an article cutter movable around an orbit, article clamping dies reciprocable toward and away from said article, cutter driving means connected to and driven by the shaft and connected to the cutter to drive the cutter around its orbit with a component of motion in the direction of movement of the moving article equal to the speed of the moving article and die moving means actuated by the said cutter driving means.

2. Apparatus for severing a moving article which comprises a single revolution shaft having a fixed longitudinal axis, an article cutter movable around an orbit, article clamping dies reciprocable toward and away from said article, cutter driving means connected to and driven by the shaft and connected to the cutter to drive the cutter around its orbit with a component of motion in the direction of movement of the moving article equal to the speed of the moving article and die reciprocating means actuated by the cutter driving means.

3. Apparatus for severing a moving article which comprises a single revolution shaft having a fixed axis, an article cutter movable around an orbit, article clamping dies disposed on either side of the said cutter and reciprocable into and out of clamping engagement with an article to be severed, the dies being movable with the cutter in directions parallel to the longitudinal axis of the article at a constant speed equal to the speed of the moving article, cutter driving means connected to and driven by the shaft and connected to the cutter to drive the same around its orbit, and means actuated by the shaft for reciprocating the dies and for moving the dies parallel to the longitudinal axis of the article.

4. Apparatus for severing a moving article which comprises a single revolution shaft having a fixed axis, a carriage reciprocably actuated by said shaft in directions parallel to the line of travel of an article to be severed, an article cutter movable with the carriage and reciprocably actuated by the shaft in directions transverse to the line of travel of the article, and article clamping dies movable with the carriage and reciprocably actuated toward and away from the article.

5. Apparatus for severing a moving article which comprises a single revolution shaft having secured thereto a heart cam having a flattened point and a substantially straight face diametrically opposite thereto, a reciprocable carriage having cam followers engageable with said cam, an article cutter movable with the carriage, and means connected to and driven by the shaft and connected to the cutter for reciprocating the cutter.

6. Apparatus for severing a moving article which comprises a slidably mounted carriage, a single revolution shaft extending thru said carriage and having a fixed axis, heart cams secured to the shaft on either side of and adjacent to the carriage and engageable with cam followers carried by the carriage, eccentrics secured to the shaft adjacent to the cams, connecting rods having bearing engagement with the eccentrics and pivotal attachment to a cutter carrier which has sliding engagement in the carriage, an article cutter secured to the cutter carrier, article clamping dies reciprocable in the carriage on either side of the cutter, and means carried by the cutter carrier for positively reciprocating the dies during movement of the carriage and cutter.

7. Apparatus for severing a moving article which comprises a single revolution shaft, an article cutter movable around an orbit, means connected to and driven by said shaft and connected to the cutter for driving the cutter around its orbit, a clutch on the shaft for intermittently driving the shaft, and length indicating means associated with the shaft and with clutch tripping means for ensuring the severing of an article into portions of substantially equal predetermined lengths.

8. Apparatus for severing a moving article which comprises a single revolution shaft, an article cutter movable around an orbit, means connected to and driven by said shaft and connected to the cutter for driving the cutter around its orbit, a clutch on the shaft for intermittently driving the shaft, and length indicating means associated with the shaft and with a clutch tripping member continuously rotated at a speed predetermined with respect to the speed of travel of an article to be severed.

9. Apparatus for severing a moving article which comprises a single revolution shaft, an article cutter movable around an orbit, means connected to and driven by said shaft and connected to the cutter for driving the cutter around its orbit, a clutch on the shaft for intermittently driving the shaft, length indicating means associated with the shaft, a clutch tripping member continuously rotated at a speed predetermined with respect to the speed of travel of an article to be severed and a rack reciprocable by said shaft, operatively associated with said clutch tripping member and adaptable during rotation of the said shaft to accelerate the rotation of the said member.

10. Apparatus for severing a moving article which comprises a single revolution shaft having a fixed axis, an article cutter driven by said shaft around an orbit, a clutch on the shaft, a continuously driven clutch tripping member, means associated with the shaft and member for accelerating the movement of the said member during rotation of the shaft, and brake means operatively associated with the said member for controlling the accelerated movement of the said member.

11. Apparatus for severing a moving article, comprising, in combination, a shaft having a fixed longitudinal axis, an article cutter moving around an orbit, article clamping dies reciprocable toward and away from said article to clamp to and be released from said article and movable with the latter at a constant speed equal to the speed of the article and in a direction opposite to that of the movement of the article, cutter driving means connected to and driven by the shaft and connected to the cutter to drive the cutter around an orbit, and die moving means actuated by the said cutter driving means to clamp the dies to the article at the beginning of movement of the cutter with the article and to release the dies from the article prior to the beginning of movement in a direction opposite to that of the article.

12. Apparatus for severing a moving article, which comprises a shaft having a fixed longitudinal axis, an article cutter, article clamping dies associated with the cutter, means for reciprocating said dies and cutter in straight lines parallel to the line of movement of the moving article and in one direction at a constant speed equal to the speed of the moving article, cutter driving means connected to and driven by the shaft to drive the cutter, and means actuated by the cutter driving means for moving the clamping dies to clamp the latter to the article at the beginning of effective operation on the part of the cutter and to release the dies from the article after the cutter has severed the article.

13. In an apparatus of the class described, the combination of a member continuously rotatable at a speed predetermined with respect to the speed of travel of a continuously moving article, adjustable means for periodically accelerating the speed of rotation of said continuously rotatable member, mechanism periodically movable with and at the speed of such moving article for acting upon the same, and means controlled by the said member for controlling the periodic actuation of the said mechanism.

14. In an apparatus of the class described, the combination of means for continuously moving an article to be acted upon, a trip shaft, means for continuously driving the trip shaft, means for periodically acting upon the said moving article actuated by the said trip shaft, and adjustable means for periodically accelerating the speed of rotation of the trip shaft.

15. An apparatus for acting upon a continuously moving article comprising a trip shaft, means for rotating the trip shaft during movement of the said article, mechanism controlled by the trip shaft for acting upon said article at substantially equally spaced points, and adjustable means controlled by said mechanism for periodically accelerating the speed of rotation of said trip shaft.

16. Apparatus for acting upon a continuously moving article comprising a continuously rotatable trip shaft, a tripable clutch controlled by the said shaft, means arranged to be driven by said clutch when the same is tripped by said shaft to act upon said moving article at substantially equally spaced points, and adjustable means operable during the movement of said first mentioned means for accelerating the rotation of said trip shaft.

17. Apparatus for acting upon a continuously moving article comprising a supporting base, a rotatable trip shaft carried thereby, means for driving the trip shaft continuously, adjustable means for periodically accelerating the speed of rotation of the trip shaft, a cam secured to said trip shaft, clutch tripping means carried by the base and periodically actuated by the said cam, a periodically rotatable drive shaft, a clutch associated with said shaft and controlled by said clutch tripping means, and means driven by said drive shaft for periodically acting upon said moving article.

18. Apparatus for acting upon a continuously moving article comprising a supporting base, a rotatable trip shaft carried by the base, means for driving the trip shaft continuously, a cam secured to said trip shaft, clutch tripping means carried by the base and periodically actuated by said cam, a drive shaft, a clutch operatively associated with said drive shaft and controlled by said clutch tripping means for periodically rotating said drive shaft, means driven by said drive shaft for periodically acting upon the said moving article, and adjustable means carried by the drive shaft and the trip shaft for accelerating rotation of the trip shaft during rotation of the drive shaft.

19. Apparatus for acting upon a continuously moving article comprising a trip shaft provided with a plurality of clutches, driving means associated with one of said clutches for rotating said trip shaft in one direction at a given speed, tripping means actuated periodically by said trip shaft, mechanism for periodically acting upon said continuously moving article controlled by said tripping means, and adjustable means operatively associated with said mechanism and the other of said clutches for accelerating the rotational speed of the trip shaft during actuation of the said mechanism.

20. An apparatus for acting upon a continuously moving article comprising a continuously driven trip means, an acting member periodically driven with and at the speed of such continuously moving article for acting thereupon, means operable during movement of the said acting member to accelerate the speed of rotation of said trip means, and brake means associated with said trip means for preventing overrunning of the latter at the end of the acceleration of said trip means.

21. An apparatus for acting upon a continuously moving article comprising driving means, a trip shaft constantly driven by said driving means, a shaft periodically coupled with said driving means by said trip shaft and arranged to actuate means for acting upon said moving article and a connecting rod adjustably carried by said shaft and arranged to periodically act upon said trip shaft to accelerate the same.

22. An apparatus for acting upon a continuously moving article comprising a main shaft arranged to drive mechanism for acting upon the article, a trip shaft having a pair of overrunning clutches thereon, driving means constantly driving said trip shaft through one of said overrunning clutches and arranged to be periodically coupled with said main shaft through means controlled by said trip shaft, a connecting rod having an adjustable eccentric mounted on said main shaft and arranged to rotate said trip shaft through the other of said overrunning clutches.

In testimony whereof I hereunto affix my signature this 5th day of April, 1928.

KARL W. HALLDEN.